United States Patent
Riemann et al.

(10) Patent No.: US 10,945,060 B2
(45) Date of Patent: Mar. 9, 2021

(54) INVISIBLE HEADLINER MICROPHONE

(71) Applicant: Harman Becker Automotive Systems GmbH, Karlsbad (DE)

(72) Inventors: Marco Salvatore Riemann, Munich (DE); Darin Krajewski, Karlsbad (DE); Viktor Dobos, Karlsbad (DE); Zoltan Giang-Son Kleinheincz, Karlsbad (DE); Florian Czinege, Karlsbad (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 16/671,966

(22) Filed: Nov. 1, 2019

(65) Prior Publication Data
US 2020/0145743 A1 May 7, 2020

Related U.S. Application Data

(60) Provisional application No. 62/756,386, filed on Nov. 6, 2018.

(51) Int. Cl.
| | |
|---|---|
| *H04R 3/00* | (2006.01) |
| *H04R 17/02* | (2006.01) |
| *H04R 1/08* | (2006.01) |
| *B60R 11/02* | (2006.01) |
| *B60R 11/00* | (2006.01) |

(52) U.S. Cl.
CPC ............ *H04R 1/08* (2013.01); *B60R 11/0247* (2013.01); *B60R 2011/0028* (2013.01); *H04R 2499/13* (2013.01)

(58) Field of Classification Search
CPC .................................................. H04R 2499/13
USPC ........................................... 381/86, 111–115
See application file for complete search history.

(56) References Cited

U.S. PATENT DOCUMENTS

| | | |
|---|---|---|
| 2012/0213399 A1 | 8/2012 | Li et al. |
| 2013/0208913 A1* | 8/2013 | Hook .................. B60R 11/0247 381/86 |
| 2015/0165983 A1 | 6/2015 | Pan et al. |

FOREIGN PATENT DOCUMENTS

EP     3402150 A1     11/2018

OTHER PUBLICATIONS

Extended European Search Report for Application No. 19204878.3, dated Jan. 28, 2020, 9 pages.

* cited by examiner

*Primary Examiner* — George C Monikang
(74) *Attorney, Agent, or Firm* — Brooks Kushman P.C.

(57) ABSTRACT

A microphone assembly includes a printed circuit board that defines a tab that is configured to extend into an opening defined by a substrate layer of a headliner. The microphone assembly includes a microphone element mounted on the tab. The microphone assembly includes a sealing element that surrounds the tab and the microphone element and is configured to fill the opening and define an air path from a cabin side of the substrate layer to the printed circuit board or the microphone element.

20 Claims, 4 Drawing Sheets

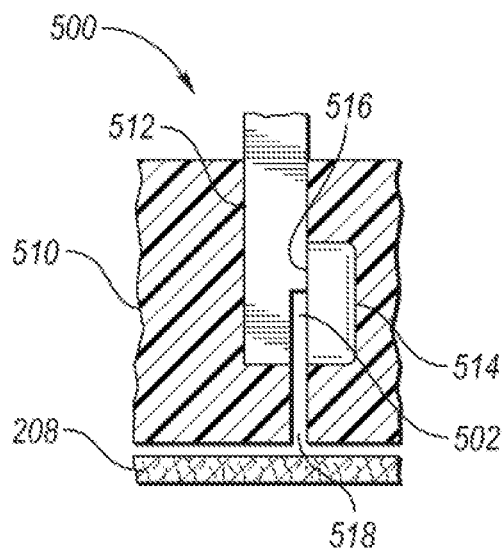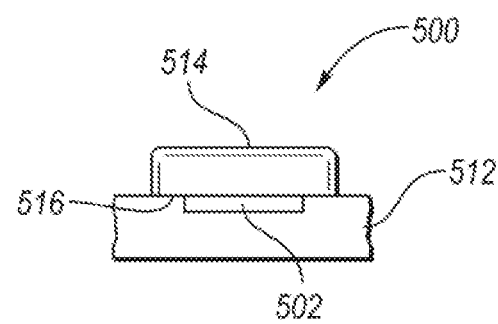
FIG. 5A
FIG. 5B
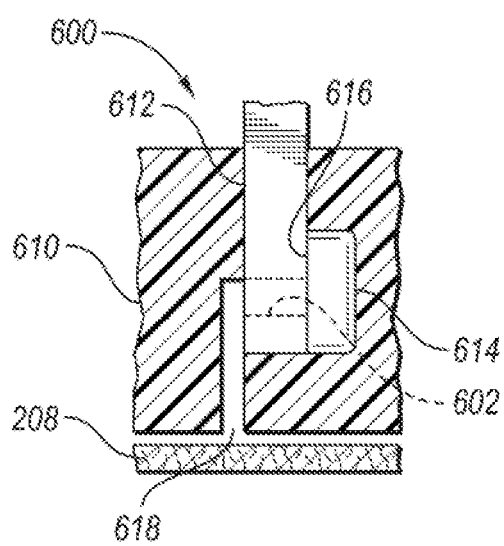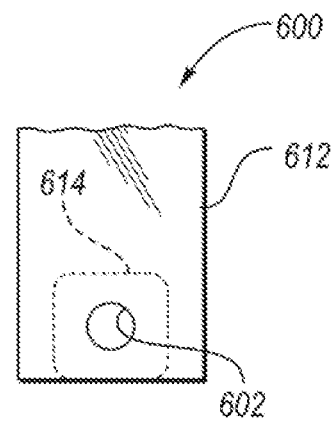
FIG. 6A
FIG. 6B

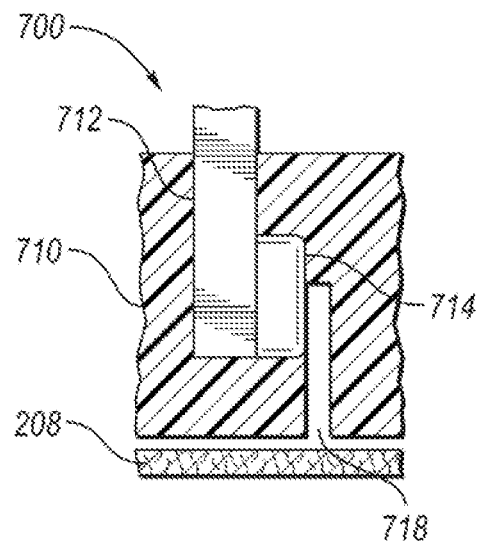
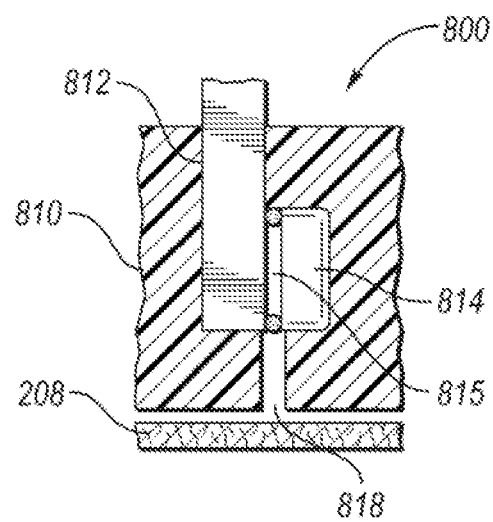
FIG. 7  FIG. 8
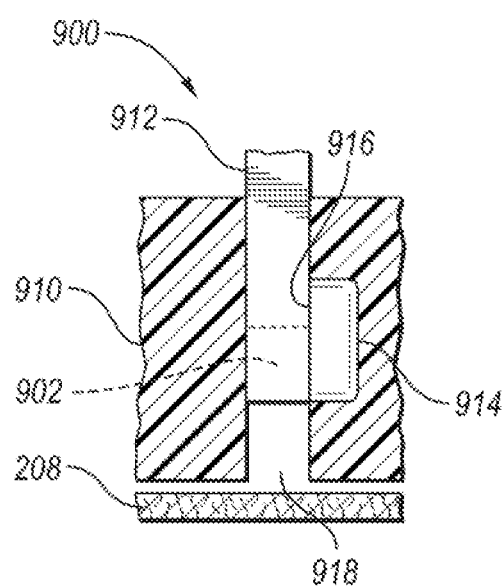
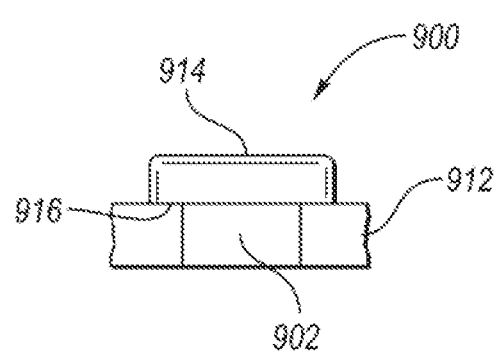
FIG. 9A  FIG. 9B

INVISIBLE HEADLINER MICROPHONE

CROSS-REFERENCE TO RELATED APPLICATIONS

This application claims the benefit of U.S. provisional application Ser. No. 62/756,386 filed Nov. 6, 2018, the disclosure of which is hereby incorporated in its entirety by reference herein.

TECHNICAL FIELD

This application generally relates to a microphone assembly for a vehicle.

BACKGROUND

Modern vehicles often incorporate systems that require sound input. For example, many vehicles include hands-free telephony capability. Hands-free telephony operates by using speakers and microphones within the vehicle instead of those associated with a cellular device. The cellular device may establish communication with the hands-free telephony system to transfer microphone and speaker data. Vehicles may further provide a voice recognition system for allowing the user to issue commands using spoken words.

Design effort is also expended to create a quiet cabin environment in vehicles. A typical goal in vehicle design is to minimize audible noise in the cabin. Consumers desire to be isolated from road noise, powertrain noise, and other unwanted noise sources. Some modern vehicles include a noise management system to reduce or change the character of the audible noise in a vehicle cabin. The noise management system may operate by generating noises or sounds that enhance the driving experience.

Such systems may operate by using microphones and speakers. The systems may receive audio signals from the microphones. As a variety of systems may utilize microphone inputs, vehicles may include one or more microphones located m various positions.

SUMMARY

A microphone assembly is configured with a microphone element mounted on a printed circuit board. The printed circuit board defines a tab that extends into a shaft defined in the headliner. The microphone element is mounted on the tab, A sealing element surrounds the tab and microphone element and seals the shall. The sealing element further defines an air path from the cabin side of the headliner to the microphone element. The microphone assembly is installed on a first side of the headliner. The headliner is configured with an acoustically transparent layer on a side of the headliner opposite the side that the microphone assembly is installed. The result is that the microphone assembly is installed with no visible openings for the microphones.

A microphone assembly includes a printed circuit board defining a tab that extends from the printed circuit board and is configured to extend into an opening defined by a substrate layer of a vehicle headliner. The microphone assembly includes a microphone element mounted on the tab such that a port of the microphone element for receiving sound waves is oriented toward the tab. The microphone assembly includes a sealing element surrounding the tab and the microphone element and being configured to fill the opening and define an air path between a surface of the sealing element exposed to air and the tab.

The printed circuit board may define a channel that connects the air path to the port of the microphone element. The channel may be generally parallel to a surface of the tab that is adjacent to the port. The channel may be generally rectangular in shape. The channel may be generally perpendicular to a surface of the tab that is adjacent to the port. The sealing element may define a cavity adjacent to a surface of the tab, A cross-sectional area of the cavity may be greater than that of the air path. The microphone assembly may further include a housing that is configured to define a passage for the tab to pass through and the sealing element may be further configured to fill the passage between the tab and the housing. The sealing element may further define a flange configured for positioning on the substrate layer and for limiting travel of the sealing element into the opening.

A microphone assembly includes a printed circuit board defining a lab that is configured to extend into an opening defined by a substrate layer of a headliner and a microphone element mounted on the tab and including a port for receiving sound waves. The microphone assembly includes a sealing element surrounding the tab and the microphone element and configured to fill the opening and define an air path between a surface of the sealing element exposed to air and the port of the microphone element.

The microphone element may be mounted such that the port is on a surface of the microphone element that is not adjacent to the tab. The microphone element may be mounted such that the port is on a surface of the microphone element that is adjacent to the tab and mounted such that an air gap is defined between the port and the tab, wherein the air gap is connected to the air path. The sealing element may define a cavity proximate the port and connected to the air path. A cross-sectional area of the cavity is greater than that of the air path. The sealing element may further define a flange configured for positioning on the substrate layer and for limiting travel of the sealing element into the opening. The microphone assembly may further include a housing that is configured to define a passage for the tab to pass through and wherein the sealing element is farther configured to fill the passage between the tab and the housing.

A headliner assembly for a vehicle includes a headliner including an acoustically transparent layer that is exposed to a cabin of the vehicle and a base substrate layer defining an opening that extends through the base substrate layer. The headliner assembly includes a microphone assembly including a printed circuit board defining a tab configured to extend into the opening, a microphone element mounted to the tab, and a sealing element configured to fill the opening, surround the tab and the microphone element and define at least a portion of an air path between the cabin and the microphone element.

The printed circuit board may define a channel that is generally parallel to a surface of the tab that is adjacent to a port of the microphone element and connects the portion of the air path defined by the sealing element to the port. The printed circuit board may define a channel that passes through the tab to connect the portion of the air path defined by the sealing element to the port of the microphone element. The sealing element may define a cavity adjacent to a surface of the tab, the cavity having a cross-sectional area that is greater than that of the portion of the air path.

BRIEF DESCRIPTION OF THE DRAWN

FIG. 5A depicts a side view of a portion of a first example microphone assembly defining an air path formed in part by a printed circuit board.

FIG. 5B depicts a bottom view of a portion of the first example microphone assembly defining an air path formed in part by a printed circuit board.

FIG. 6A depicts a side view of a portion of a second example microphone assembly defining an air path formed in part by a printed circuit board.

FIG. 6B depicts a front view of a portion of the second example microphone assembly defining an air path thrilled by a printed circuit board.

FIG. 7 depicts a side view of a portion of a third example microphone assembly for a top port microphone element.

FIG. 8 depicts a side view of a portion of a fourth example microphone assembly defining an air gap between a board and sensor.

FIG. 9A depicts a side view of a portion of a fifth example microphone assembly defining an air path formed by a printed circuit board.

FIG. 9B depicts a bottom view of a portion of the fifth example microphone assembly defining an air path formed by a printed circuit board.

DETAILED DESCRIPTION

Figure 1:
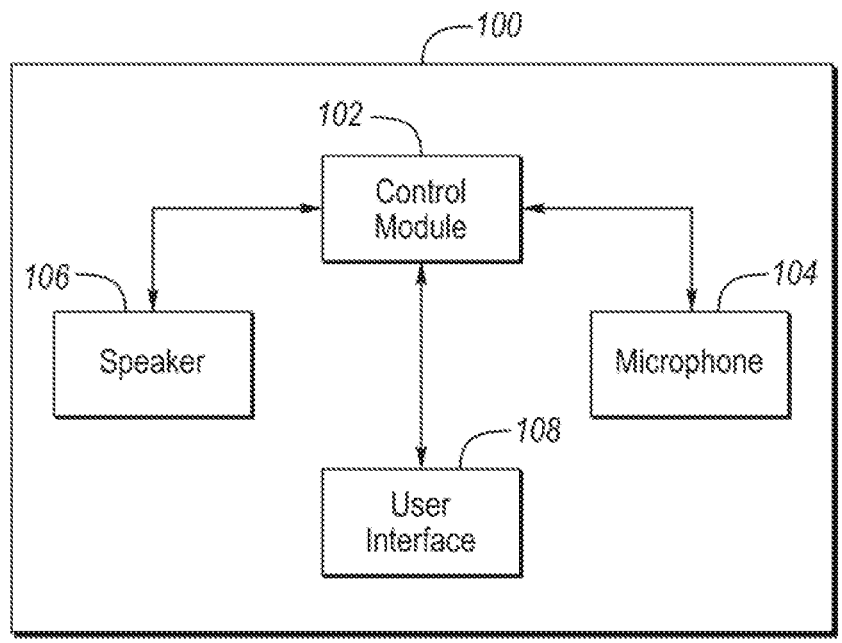
FIG. 1 depicts a noise management system within a vehicle environment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, field-programmable gate arrays (FPGA), memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed herein.

Modern vehicles may include a variety of sound management systems and devices that cooperate to manage the aural environment within the vehicle. For example, a vehicle may include a road noise cancellation (RNC) system that is configured to reduce the amount of road noise heard by vehicle occupants. Such systems, typically operate by receiving input from one or more microphones and outputting a signal to one or more loud speakers that modifies the sound pattern. The systems can mask unwanted road and engine noise making the cabin seem quieter. Other applications may include hands-free communication systems. Other vehicle sound management systems may include active noise control (ANC) and in-car communication (ICC) systems.

These vehicle systems use one or more microphones to receive sound/noise input. The microphones may be installed at various locations within the vehicle. Sound propagates through air as a pressure wave. A source may generate a sound by causing a vibration in the air (or other medium). These vibrations then propagate from the source through the medium (e.g., air). A microphone may operate by receiving these pressure waves and converting the pressure waves into an electrical signal. To accomplish this, the microphone element may need to be exposed to the pressure wave.

Existing in-vehicle microphones receive the pressure wave through openings that expose the cabin air to the microphone elements. As an example, a microphone may be installed in a headliner of the vehicle. The microphone assembly for installation in the headliner may include a visible A-surface grill/bezel that defines one or more openings. The A-surface may be that surface that is visible within the cabin. The microphone assembly may include a housing that attaches to the grill/bezel from a B-side of the headliner. The B-side may be that surface opposite the A-surface and is generally not visible within the cabin. These bezels are generally visible within the cabin and may be aesthetically displeasing. In addition, the openings can allow dust and moisture intrusion into the microphone element which may cause reduced performance. An improved microphone assembly is disclosed that does not require these openings.

FIG. 1 depicts a block diagram of a vehicle 100 that includes a controller 102. The controller 102 may include a microprocessor and memory to implement various features and functions. For example, the controller 102 may be part of a RNC system or an ANC system. The controller 102 may be part of a ICC system that manages in-vehicle communications. The controller 102 may also be configured as a sound processor to implement telematics features such as speech recognition and hands-free system operation.

The controller 102 may be electrically connected to one or more loud speakers 106. The loud speakers 106 may be configured to generate sound based on signals received from the controller 102. The controller 102 may be electrically connected to one or more microphones 104. The microphones 104 may be in different positions within the vehicle 100. The microphones 104 may be configured to generate an electrical signal representing sound or noise at the position of the microphones 104. The vehicle 100 may thither include a user interface 108. In some examples, the user interface 108 may be a touch-screen display that can display content from the controller 102 and providing inputs (e.g., menu selections) to the controller 102. The user interface 108 may also include buttons and switches. The configuration and usage of the user interface 108 may depend on the purpose of the controller 102.

The vehicle 100 may flintier include a headliner (not shown in FIG. 1). The headliner may be configured to line an interior of a roof of the vehicle 100. The headliner may be configured to provide noise and thermal insulation for the cabin of the vehicle. The headliner may also be configured for mounting various components. For example, lights, control panels, and microphones may be mounted to the headliner.

Figure 2:
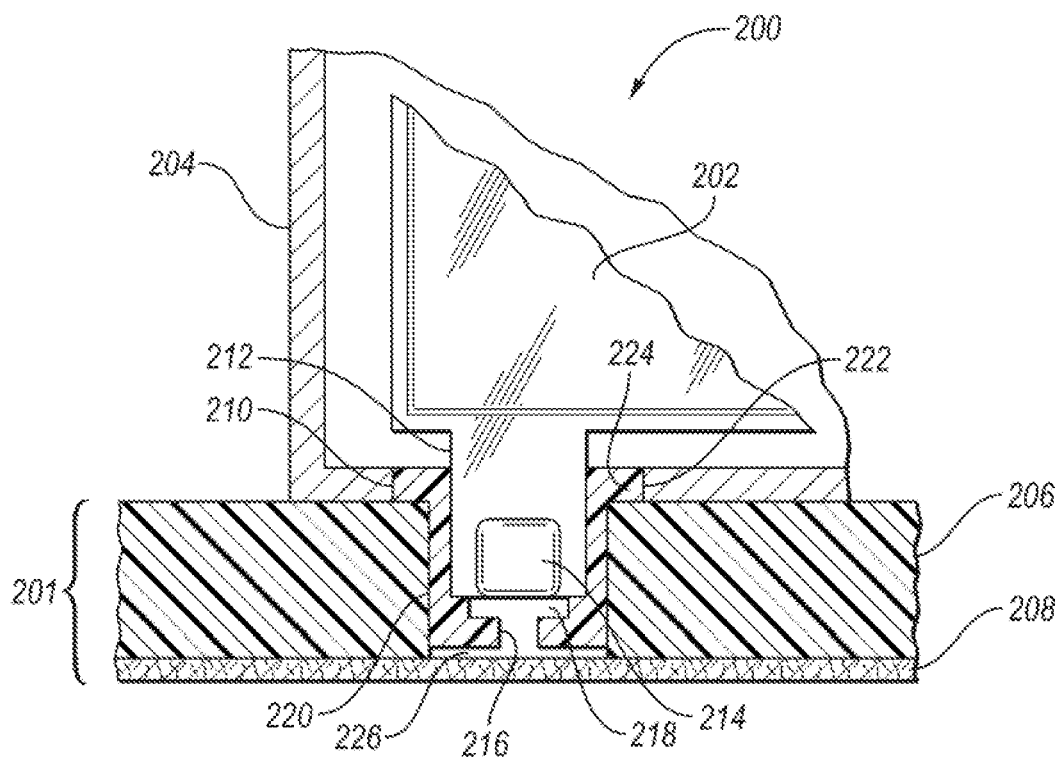
FIG. 2 depicts a front view of a microphone assembly for mounting to a headliner of a vehicle.
Figure 3:
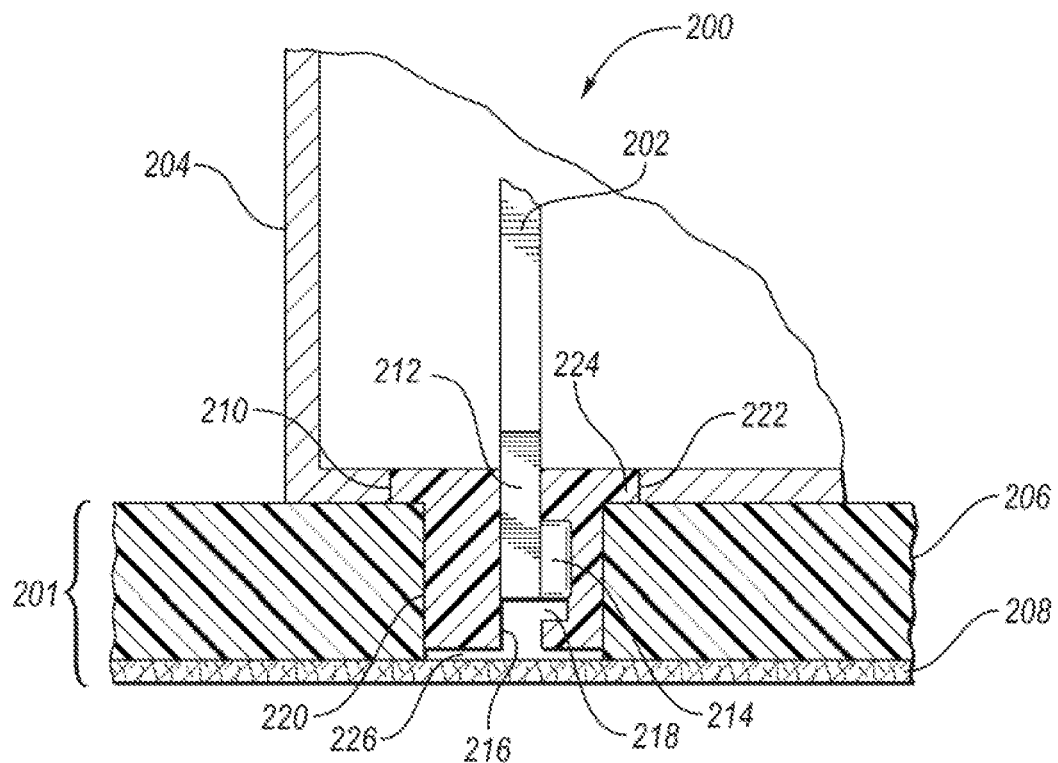
FIG. 3 depicts a side view of the microphone assembly.
Figure 4:
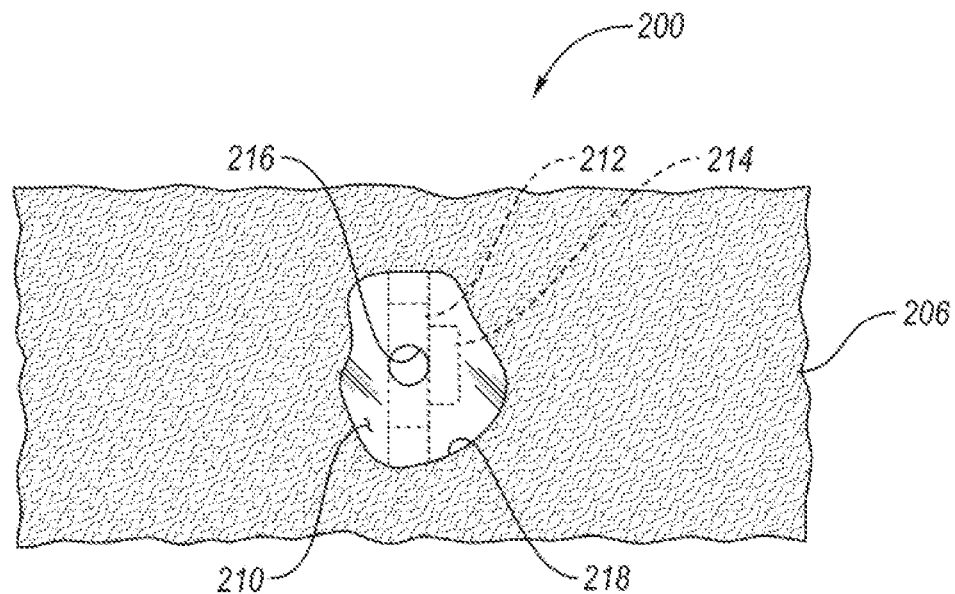
FIG. 4 depicts a bottom view of the microphone assembly.

FIG. 2 depicts a front view of a microphone assembly 200 that is configured to be installed in a vehicle headliner 201. FIG. 3 depicts a side view of the microphone assembly 200. FIG. 4 depicts a bottom view of the microphone assembly 200. The microphone assembly 200 may be configured for mounting to the vehicle headliner 201. The vehicle headliner 201 may be a multi-layer construction including a base substrate layer 206 that is covered by an A-surface layer 208. The A-surface layer 208 may, be exposed to a cabin compartment of the vehicle 100. The base substrate layer 206 may be constructed of a composite material having application specific stiffness, strength, and insulating characteristics. The A-surface layer 208 may be an acoustically transparent material. An acoustically transparent material may be a material that allows sound waves to penetrate through the material. For example, the A-surface layer 208 may be an acoustic fabric configured to be acoustically transparent. Acoustically transparent fabrics may include fabrics with an open weave that permits air to pass through easily.

Acoustically transparent materials may be evaluated based on a noise reduction coefficient (NRC) that quantifies the sound absorption of a material. For example, the NRC may be measured by the Standard Test Method for Sound Absorption and Sound Absorption Coefficients by the Reverberation Room Method defined by ASTM International (ASTM C423-17). The NRC may represent the amount of sound that is absorbed by the material. An ideally acoustically transparent material may have a NRC that is zero. In practice, the acoustically transparent material should have a low NRC.

The A-surface layer 208 may be bonded or otherwise secured to the base substrate layer 206. In some configurations, the A-surface layer 208 may be stretch fit across the base substrate layer 206.

The base substrate layer 206 may define an opening or shaft 220. The shaft 220 may be rectangular. The shaft 220 may extend completely through the base substrate layer 206. The A-surface layer 208 may conceal the shaft 220 from the cabin-side of the headliner 201.

The microphone assembly 200 may include a housing 204. The housing 204 may be configured to enclose and provide structural support for other elements of the microphone assembly 200. The housing 204 may be formed of a plastic material, but it is not limited as such. The housing 204 may provide access for one or more electrical connectors (not shown). The electrical connectors may be configured to transfer signals between the microphone assembly 200 and an external controller (e.g., control module 102). The housing 204 may further define an opening 222.

The microphone assembly 200 may include a printed circuit board 202. The printed circuit board 202 may provide a surface for mounting circuit elements. The printed circuit board 202 may further include conductive traces routed to the circuit elements to establish electrical connections between components mounted on the printed circuit board 202. The printed circuit board 202 may include circuitry configured to process a microphone signal and transfer the signal to the external controller for further processing. The circuitry may include filtering elements and power management features. A surface of the printed circuit board 202 may lie in a plane.

The printed circuit board 202 may define a tab 212 that extends from the printed circuit board 202 within the plane. The tab 212 may be sized so that the tab 212 may be inserted through the opening 222 of the housing 204 and into the shaft 218. The shaft 218 may be sized to permit a predetermined amount of clearance between surfaces of the tab 212 and the base substrate 206. In some configurations, the tab 212 may be formed proximate a corner of the printed circuit board 202.

A microphone element 214 may be mounted to the tab 212 of the printed circuit board 202. The microphone element 214 may utilize microelectromechanical systems (MEMS) technology and may be an integrated circuit/sensor assembly that is mounted to the tab 212. The microphone element 214 may be a piezoelectric microphone. The microphone element 214 may be an electret condenser microphone. The microphone element 214 may also be a condenser microphone. The microphone element 214 may be configured to convert a sound wave at a port of the microphone element 214 sensor into an electrical signal. The microphone element 214 may define a port at which air is received for sensing and conversion. The location of the port relative to mounting elements for connecting to the tab 212 may depend upon the particular microphone element 214. The mounting elements may be electrical connections that are soldered to the tab 212 of the printed circuit board 202. For example, the port may be a bottom port that is located on a same surface as the mounting elements. The port may be a top port that is located on an opposite surface as the mounting elements. The microphone element 214 may be mounted on the tab 212 and oriented such that the port faces any direction. For example, the microphone element 214 may be mounted such that the port is facing the tab 212. The microphone element 214 may be mounted such that the port is arranged in a plane perpendicular to the tab 212.

The microphone assembly 200 may further include an acoustic seal 210. The acoustic seal. 210 may be configured to be disposed in the shaft 220 to fill and seal areas between the tab 212, the microphone element 214 and the surfaces of the base substrate layer 206. The acoustic seal 210 may be further configured to seal the opening 222 in the housing 204. The acoustic seal 210 may include a main body that is configured to fit within the shaft 220. The acoustic seal 210 may include a flange 224 that is configured to seal the opening 222 in the housing 204, The flange 224 may extend beyond the main body and rest on a surface of the base substrate layer 206 when positioned in place. The flange 224 may be flush with an outer surface of the housing 204 when installed. The acoustic seal 210 may be configured to provide an acoustical seal between the openings in each surface of the base substrate layer 206. The acoustic seal 210 may be shaped to fill the shaft 220. The acoustic seal 210 may define a cavity for receiving the tab 212 and the microphone element 214.

The acoustic seal 210 may be constructed of a resilient material such as rubber. The acoustic seal 210 may be molded to the shape of the tab 212 and the microphone element 214. The acoustic seal 210 may be permanently attached to the tab 212 and/or housing 204. The acoustic seal 210 may be sized such that an air gap 226 remains between a lower surface of the acoustic seal 210 and the A-surface layer 208 when the microphone assembly is positioned on the headliner 201.

The acoustic seal 210 may be further configured to define an air path from the A-surface layer 208 to the port of the microphone element 214. The shape and routing of the air path may depend upon the location of the port of the microphone element 214. The acoustic seal 210 may be configured to define an opening 216 proximate the A-surface layer 208 of the headliner 201. The opening 216 may extend into the acoustic seal 210 toward the tab 212 and/or microphone element 214. The acoustic seal 210 may further define a cavity 218 that is adjacent to a surface of the tab 212 and/or the microphone element 214, The opening 216 may be configured to provide an aft path to the cavity 218. In some configurations, the cavity 218 may be adjacent the port of the microphone element 214, A cross-section area of the cavity 218 may be greater than that of the opening 216. The acoustic seal 210 may provide an acoustic sealing function to prevent leakage of air that enters the air path from exiting at undesired locations.

In some configurations, the tab 212 of the printed circuit board 202 may also be configured to provide an air path to the microphone element 214. For example, FIG. 5A (side view) and FIG. 5B (bottom view) depict a first alternative tab configuration 500 in which an air path is routed parallel to a mounting surface of a tab 512. In the first alternative tab configuration 500, the tab 512 defines a channel 502 to provide an airpath to a mounting surface 516 of a microphone element 514. The channel 502 may be generally parallel to the mounting surface 516 of the microphone element 514. The channel 502 may be formed by removing material from the tab 512 at the mounting surface 516 of the microphone element 514. In some configurations, the tab 512 may be drilled to create an air path or channel 502. The channel 502 may be a rectangular channel or may be alternatively shaped. An acoustic seal 510 may be configured to seal the interfaces between the tab 512 and the microphone element 514, including edges of the mounting surface 516. Further, the acoustic seal 510 may be configured to provide an air path 518 from the A-surface material 208 to the channel 502. The configuration may be useful when the microphone element 514 includes a bottom port for sensing. In some configurations, the channel 502 may be comprised of different cavities. For example, a larger cavity may be defined proximate the port of the microphone element 514 and a smaller channel or cavity may provide an air path from the interface to the air path defined by the acoustic seal 210. The size of the openings and channels may be defined by a cross-sectional area. The channel 502 may be shaped to obtain desired sensing properties of the sound waves.

FIG. 9A (side view) and FIG. 5B (bottom view depict a variation 900 of the first alternative tab configuration. In the variation 900, a tab 912 defines a channel 902 to provide an airpath to a mounting surface 916 of a microphone element 914. The channel 902 may be generally parallel to the mounting surface 916 of the microphone element 914. The channel 902 may be formed by removing material from the tab 912 proximate the mourning surface 916 of the microphone element 914. In the example depicted, the channel 902 is defined as passing completely through a cross-section of the tab 912. The tab 912 may be defined to have a predetermined thickness. A dimension of the channel 902 in a direction perpendicular to the mounting surface 916 may be equal to the thickness. The channel 902 may be a rectangular channel or may be alternatively shaped. An acoustic seal 910 may be configured to seal the interfaces between the tab 912 and the microphone element 914, including edges of the mounting surface 916. The acoustic seal 910 may also define a bottom surface for the channel 902. The tab 912 may define the side surfaces of the channel 902. The acoustic seal 910 may be configured to provide an air path 918 from the A-surface material 208 to the channel 902. The configuration may be useful when the microphone element 914 includes a bottom port for sensing. In some configurations, the channel 902 may be comprised of different cavities. For example, a larger cavity may be defined proximate the port of the microphone element 914 and a smaller channel or cavity may provide an air path from the interface to the air path defined by the acoustic seal 910. The size of the openings and channels may be defined by a cross-sectional area. The channel 902 may be shaped to obtain desired sensing properties of the sound waves.

FIG. 6A (side view) and FIG. 6B (front view) depict a second alternative tab configuration 600 in which an air path is routed perpendicular to a mounting surface 616 of a tab 612, In the second alternative tab configuration 600, the tab 612 defines a channel 602 that is generally perpendicular to the mounting surface 616 of the tab 612. The channel 602 may be configured to provide an air path to the mounting surface 616 of the microphone element 614. An acoustic seal 610 may, be configured to seal the interfaces between the tab 612 and the microphone element 614. Further, the acoustic seal 610 may be configured to provide an air path 618 from the A-surface material 208 to the channel 602. In some configurations, the channel 602 may be comprised of different sized cavities. For example, a larger cavity may be defined proximate the port of the microphone element 614 and a smaller channel or cavity may provide an air path from the interface to the openings of the acoustic seal 610. The channel 602 may be shaped to obtain desired sensing properties of the sound waves.

The acoustic seal 210 and the tab 212 may be configured to cooperatively direct air from the A-surface material 208 to the port of the microphone element 214. In configurations in which the tab 212 of the printed circuit board 202 defines a portion of the aft path to the microphone element 214, the acoustic seal 210 may be configured to provide an air path (e.g., 518, 618) from the A-surface material 208 to the channels (e.g., 502, 602) defined in the tab (e.g., 512, 612).

In other configurations, the acoustic seal 210 may define the air path. For example, in a top port configuration, the acoustic seal 210 may be formed to define the air path from the A-surface material 208 to the top surface of the microphone element 214. FIG. 7 depicts an example of a top port configuration 700. A microphone element 714 is attached to a tab 712 of a printed circuit board. An acoustic seal 710 may define an air channel 718 from the A-surface layer to a top port of the microphone element 714.

In a configuration depicted in FIG. 8, a microphone element 814 may be mounted to a tab 812 such that an air gap 815 is present between the port and the tab 812. An acoustic seal 810 may be configured to provide an air path 818 between the A-surface layer 208 and the air gap 815. The acoustic seal 810 may be further configured to seal the air gap 815 around edges of the microphone element 814.

The microphone assembly 200 is configured to define an air path from the A-surface material 208 to the sensing portion of the microphone element 214. The air path may be defined by the acoustic seal 210. The air path may be defined by the acoustic seal 210 and the tab 212. The shape of the air path may be configured to optimize collection of sound in the vehicle cabin. The shape and dimensions of the air path may be selected to result in a predetermined frequency response.

The microphone assembly 200 may be attached to the headliner 201. A one-piece assembly may include the microphone housing 204, the acoustic seal 210, and an attachment bracket. The attachment bracket may be configured to attached to the base substrate layer 206.

A two-piece assembly may include a first piece comprising an attachment bracket configured to attach to the base substrate layer 206 and receive the microphone housing 204. The attachment bracket may be fixed to the base substrate layer 206. The microphone housing 204 may be coupled to the acoustic seal 210 and the microphone housing 204 may be coupled to the attachment bracket. For example, the attachment bracket may be fastened to the headliner. The attachment bracket and the microphone housing 204 may include a locking mechanism such that when the microphone housing 204 is aligned and properly inserted, the locking mechanism engages to secure the pieces together.

Depending on the configuration, the printed circuit board 202 may define more than one tab 212. The number of tabs may depend on the number of microphones used for the vehicle application. Further, the air path defined by the acoustic seal 210 may be oriented in different directions to emphasize sound from a particular direction. Each tab may be similarly constructed as described.

The microphone assembly described has an advantage in that the microphone is concealed from view within the vehicle cabin. Occupants within the vehicle may be unable to detect the presence of the microphone assembly. This allows for a more consistent, unbroken headliner surface than previous bezel/grill designs. Another advantage is that the air paths are covered so that dust and other contaminants cannot enter. As such, fewer issues with reduced performance can be expected.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A microphone assembly comprising:
    a printed circuit board (PCB) defining a tab that extends from the PCB and is configured to extend into an opening defined by a substrate layer of a vehicle headliner;
    a microphone element directly mounted on the tab such that a port of the microphone element for receiving sound waves is oriented toward the tab; and
    a sealing element surrounding the tab and the microphone element and being configured to fill the opening and define an air path between a surface of the sealing element exposed to air and the tab.

2. The microphone assembly of claim 1, wherein the tab defines a channel that connects the air path to the port of the microphone element.

3. The microphone assembly of claim 2, wherein the channel is generally parallel to a surface of the tab that is adjacent to the port.

4. The microphone assembly of claim 2, wherein the channel is generally perpendicular to a surface of the tab that is adjacent to the port.

5. The microphone assembly of claim 1, wherein the sealing element defines a cavity adjacent to a surface of the tab.

6. The microphone assembly of claim 5, wherein a cross-sectional area of the cavity is greater than that of the air path.

7. The microphone assembly of claim 1, further comprising a housing that is configured to define a passage for the tab to pass through and wherein the sealing element is further configured to fill the passage between the tab and the housing.

8. The microphone assembly of claim 1, wherein the sealing element further defines a flange configured for positioning on the substrate layer and for limiting travel of the sealing element into the opening.

9. A microphone assembly comprising:
    a printed circuit board (PCB) defining a tab that is configured to extend into an opening defined by a substrate layer of a headliner;
    a microphone element directly mounted on the tab and including a port for receiving sound waves; and
    a sealing element surrounding the tab and the microphone element and configured to fill the opening and define an air path between a surface of the sealing element exposed to air and the port of the microphone element.

10. The microphone assembly of claim 9, wherein the microphone element is mounted such that the port is on a surface of the microphone element that is not adjacent to the PCB.

11. The microphone assembly of claim 9, wherein the microphone element is mounted such that the port is on a surface of the microphone element that is adjacent to the tab and mounted such that an air gap is defined between the port and the tab, wherein the air gap is connected to the air path.

12. The microphone assembly of claim 9, wherein the sealing element defines a cavity proximate the port and connected to the air path.

13. The microphone assembly of claim 12, wherein a cross-sectional area of the cavity is greater than that of the air path.

14. The microphone assembly of claim 9, wherein the sealing element further defines a flange configured for positioning on the substrate layer and for limiting travel of the sealing element into the opening.

15. The microphone assembly of claim 9 further comprising a housing that is configured to define a passage for the tab to pass through and wherein the sealing element is further configured to fill the passage between the tab and the housing.

16. The microphone assembly of claim 9, wherein the tab defines a channel that connects the air path to the port of the microphone element.

17. A headliner assembly for a vehicle comprising:
    a headliner including:
        an acoustically transparent layer that is exposed to a cabin of the vehicle; and
        a base substrate layer defining an opening that extends through the base substrate layer; and
    a microphone assembly including:
        a printed circuit board (PCB) defining a tab configured to extend into the opening,
        a microphone element directly mounted to the tab, and
        a sealing element configured to fill the opening, surround the tab and the microphone element and define at least a portion of an air path between the cabin and the microphone element.

18. The headliner assembly of claim 17, wherein the tab defines a channel that is generally parallel to a surface thereof and the channel is adjacent to a port of the microphone element and connects the portion of the air path defined by the sealing element to the port.

19. The headliner assembly of claim 17, wherein the tab defines a channel that passes therethrough to connect the portion of the air path defined by the sealing element to the port of the microphone element.

20. The headliner assembly of claim 17, wherein the sealing element defines a cavity adjacent to a surface of the tab, the cavity having a cross-sectional area that is greater than that of the portion of the air path.

* * * * *